US008436082B2

(12) United States Patent
Du et al.

(10) Patent No.: US 8,436,082 B2
(45) Date of Patent: *May 7, 2013

(54) GAP-FILLING ADHESIVE OF STONE

(76) Inventors: Kunwen Du, Wuhan (CN); Ziqiang Xin, Wuhan (CN); Kunwu Du, Wuhan (CN)

( * ) Notice: Subject to any disclaimer, the term of this patent is extended or adjusted under 35 U.S.C. 154(b) by 0 days.

This patent is subject to a terminal disclaimer.

(21) Appl. No.: 13/178,507

(22) Filed: Jul. 8, 2011

(65) Prior Publication Data

US 2011/0301263 A1     Dec. 8, 2011

Related U.S. Application Data

(63) Continuation of application No. PCT/CN2010/071283, filed on Mar. 25, 2010.

(30) Foreign Application Priority Data

Mar. 25, 2009    (CN) .......................... 2009 1 0061335

(51) Int. Cl.
    *C07C 69/30*      (2006.01)
    *C08K 5/10*      (2006.01)
    *C08K 5/103*      (2006.01)
    *C08K 3/36*      (2006.01)
    *C08L 67/06*      (2006.01)

(52) U.S. Cl.
    USPC ........... 524/307; 524/308; 524/310; 524/318; 524/493; 524/601; 523/412

(58) Field of Classification Search .................. 524/307, 524/308, 310, 318, 493, 601; 523/412
See application file for complete search history.

(56) References Cited

U.S. PATENT DOCUMENTS

| 3,267,056 | A | * | 8/1966 | Ihde, Jr. et al. ............... 524/188 |
| 4,460,535 | A | * | 7/1984 | Kitoh et al. .................... 264/262 |
| 4,835,213 | A | * | 5/1989 | Murai et al. .................... 525/36 |
| 6,280,846 | B1 | * | 8/2001 | Darby et al. .................. 428/420 |
| 2002/0137809 | A1 | * | 9/2002 | Kogure et al. .................. 521/79 |

OTHER PUBLICATIONS

BYK-S 740 MSDS; May 11, 2009; BYK USA, Inc.*

* cited by examiner

*Primary Examiner* — Michael Pepitone
(74) *Attorney, Agent, or Firm* — Matthias Scholl P.C.; Matthias Scholl

(57) ABSTRACT

An adhesive for filling in gaps between stones, the adhesive including at least 100 weight parts of an unsaturated polyester resin suitable for air-drying, between 1 and 5 weight parts of hydrogenated castor oil, between 0 and 60 weight parts of micron silica, and between 1 and 15 weight parts of an anti-shrinking agent. The adhesive overcomes the disadvantages of conventional marble glue, such as, poor air-drying property, poor shrinkage resistance, and poor permeability. The adhesive of the invention has good permeability, strong shrinkage resistance, and high brightness after being polished, and is not sticky after curing. The invention solves the difficulty of gap-filling of stone by providing a new category of marble glue.

20 Claims, No Drawings

GAP-FILLING ADHESIVE OF STONE

CROSS-REFERENCE TO RELATED APPLICATIONS

This application is a continuation of International Patent Application No. PCT/CN2010/071283 with an international filing date of Mar. 25, 2010, designating the United States, now pending, and further claims priority benefits to Chinese Patent Application No. 200910061335.3 filed Mar. 25, 2009. The contents of all of the aforementioned applications, including any intervening amendments thereto, are incorporated herein by reference.

BACKGROUND OF THE INVENTION

1. Field of the Invention

The invention relates to an adhesive for filling in the gaps between stones. The adhesive is also suitable for filling in gaps between ceramics and other building materials.

2. Description of the Related Art

Unsaturated resin adhesives are mainly used for filling in and bonding stone. In China, they are mainly used for marble, thereby with a nickname of marble glue.

The bonding of stones includes structural bonding and non-structural bonding. Marble glue bonds stones mainly using filling in gaps therein, which means a non-structural bonding. Different from structural bonding which supports a big load, non-structural bonding employs organic adhesives to mend, fill in, strengthen, and fix the defects of stone, for example, fissures, cracks, apertures, and sand holes.

Bonding using filling in has huge difference from structural bonding in load-carrying capability. Bonding using filling in basically does not bear load, and the function of the filling in is mainly to beautify stone and standardize product size.

In the past few years, with the rapid development of bonding adhesives, marble glue has been widely applied in household decoration, quick positioning, amendment, splicing, and filling in gaps of stone.

Marble glue is mainly used for the bonding of stone with the ground, or the bonding of stone with wall having a height of less than 9 meters. Marble glue is required to bear a minor load, and thus the bonding strength thereof should meet a certain standard, but the requirement for air dry, brightness, shrinkage, and permeability is low. Gap-filling adhesives are mainly used for filling in gaps between stone and need contact with air. Thus, there is a low requirement on the bonding strength of gap-filling adhesives in contrast to that of marble glue, but the air drying, brightness, shrinkage, and permeability thereof should be high.

Marble glue, if used as a gap-filling adhesive, has the following disadvantages: a) poor air drying property, and viscosity after curing; b) there is a color difference between polished glue and stone; 3) poor shrinkage resistance, which makes the cured glue concave or separate from stone; and 4) poor permeability, which results in an incomplete filling in or produces holes.

SUMMARY OF THE INVENTION

For filling in gaps between stones, an adhesive should have the following characteristics:

1) The adhesive should have good permeability, that is to say, the colloid of the adhesive is fine and easy to blend, and after curing agents added, the adhesive has a certain fluidity and can permeate into small cracks in the stone. Because the colloid is fine, so is the filling joint, which increases the sense of beauty. 2) The adhesive should have good air-drying property and be not sticky after curing, which means an instant polishing can be carried out and no black spots occurs in the filling joints. 3) The adhesive should have good shrinkage resistance so that after the adhesive cured, no concave formed and the adhesive will not separate from stone. 4) The polished adhesive should have a brightness (dependent on the hardness of the adhesive) equivalent as that of polished stone the adhesive.

In view of the above-described problems, it is one objective of the invention to provide an adhesive for filling in gaps between stones.

To achieve the above objectives, in accordance with one embodiment of the invention, there is provided an adhesive comprising at least 100 weight parts of an unsaturated polyester resin suitable for air-drying, between 1 and 5 weight parts of hydrogenated castor oil, between 0 and 60 weight parts of micron silica, and between 1 and 15 weight parts of an anti-shrinking agent.

In a class of this embodiment, the adhesive comprises at least 100 weight parts of the unsaturated polyester resin suitable for air-drying, between 1 and 5 weight parts of the hydrogenated castor oil, between 10 and 60 weight parts of micron silica, and between 1 and 15 weight parts of the anti-shrinking agent.

In a class of this embodiment, the adhesive comprises at least 100 weight parts of the unsaturated polyester resin suitable for air-drying, between 2 and 4 weight parts of the hydrogenated castor oil, between 30 and 50 weight parts of micron silica, and between 5 and 10 weight parts of the anti-shrinking agent.

In a class of this embodiment, the adhesive comprises at least 100 weight parts of the unsaturated polyester resin suitable for air-drying, 3 weight parts of the hydrogenated castor oil, 40 weight parts of micron silica, and 8 weight parts of the anti-shrinking agent.

In a class of this embodiment, the unsaturated polyester resin suitable for air-drying is selected from the group consisting of dicyclopentadiene-modified unsaturated polyester resin synthesized using half-esterification, allyl glycidyl ether-modified unsaturated polyester resin, or trimethylolpropane diallyl ether-modified unsaturated polyester resin; to the unsaturated polyester resin suitable for air-drying, a diluent, accelerator, and inhibitor of polymerization are added according to conventional usage amount (the unsaturated polyester resin suitable for air-drying purchased from market has been added with a diluent, accelerator, and inhibitor of polymerization).

In a class of this embodiment, the adhesive further comprises between 1 and 5 weight parts of an active diluent.

In a class of this embodiment, the micron silica is between 300 and 1,000 mesh on the average.

In a class of this embodiment, the active diluent is selected from the group consisting of styrene, α-methyl styrene, glycerol diallyl ether adipate, diallyl phthalate, 2-chlorostyrene, p-tert-butyl styrene, or a mixture thereof.

In a class of this embodiment, the anti-shrinking agent is selected from the group consisting of polypropyl acetate, poly(adipate-co-propanetriol), poly vinyl acetate, polyacrylate, polystyrene, polyethylene, polyvinyl chloride, polymethyl methacrylate, or a mixture thereof.

In a class of this embodiment, in the process of the preparation of the unsaturated polyester resin suitable for air-drying, cycloalkane diols, hydrogenated bisphenol A, trans-double dehydration mannitol, or isophthalic acid is added.

Advantages of the invention are summarized below. 1) The adhesive comprises active diluents, and thus is easy to blend. The resulting colloid is fine, and after curing agents added, the adhesive has a certain fluidity and good permeability and can permeate into small cracks in the stone. Because the colloid is fine, so is the filling joint, which increases the sense of beauty. 2) The adhesive comprises the unsaturated polyester resin suitable for air-drying and thus is not sticky after curing, which means an instant polishing can be carried out and no black spots occurs in the filling joints. 3) The adhesive comprises anti-shrinking agents, and the shrinking percentage can be controlled within 1%. After the adhesive is cured, no concave formed and the adhesive will not separate from stone. 4) The polished adhesive has a brightness equivalent as that of polished stone. The brightness of the adhesive is dependent on the hardness of the unsaturated polyester resin. The hardness is relevant to the softening point of the polyester. Thus, the hardness can be improved by increasing the softening point of the polyester. 5) The invention solves the difficulty of gap-filling of stone and as a new category of marble glue, the adhesive enriches the type of marble glue.

Advantages of the adhesive are summarized below: 1) good permeability and easy to blend; 2) not sticky after curing; 3) strong shrinkage resistance and no concave formed after curing; and 4) high brightness equivalent as that of polished stone.

DETAILED DESCRIPTION OF THE EMBODIMENTS

For further illustrating the invention, experiments detailing an adhesive of colored stone are described below. It should be noted that the following examples are intended to describe and not to limit the invention.

When cured in the air, an unsaturated polyester resin suitable for air-drying is dried to form film, free of interference from oxygen, and the surface thereof is not sticky. The characteristic is known as air dry.

The principle of air dry is described below. When an unsaturated polyester resin (UPR in short) is cured at normal temperature, the surface thereof is often sticky, which causes inconvenience for use. The curing mechanism of UPR is based on the radical copolymerization. The activity of free radicals determines the polymerization rate thereby affecting the size of the polymer molecular weight.

If oxygen is involved in the curing of unsaturated polyester resins, a sticky surface will form. Free radical R. generated at early stage contacts with oxygen to yield a polymer peroxy radical $RO_2$.. The activity of R. is stronger than that of $RO_2$.. The half life of R. is $10^{-8}$ s, and that of $RO_2$. is $10^{-2}$ s. On the surface, the $RO_2$. is dominant, thereby inhibiting the increase of polymer molecular weight. However, the polymer peroxy radical $RO_2$. easily contacts with hydrogen connected to positively-charged carbon to yield a polymer hydroperoxide, that is, $ROO.+HR_1 \rightarrow ROOH+R_1..$ The polymer hydroperoxide can produce free radicals with strong activity to make reaction proceed to yield high molecular weight polymers.

For example, allyl ether ($CH_2$=CH—$CH_2$—O—) and non-conjugated double bonds (—CH=CH—$CH_2$—CH=CH—) have positive carbon atoms, and thus have the capacity of automatic oxygen absorption.

The anti-shrinkage mechanism of an anti-shrinking agent of the invention is described below. When a gap-filing adhesive of the invention is curing, the anti-shrinking agent experiences thermal expansion. The expansion offsets the volume contraction originated from the curing of the polyester around the corner. Subsequently, the two phases are cooled simultaneously. Because the anti-shrinking agent has bigger shrinking percentage than the polyester, many small holes form at the interface of the two phases. The formation of the holes eliminates the internal stress, and thus the polyester no longer contracts.

The unsaturated polyester resin suitable for air-drying includes but is not limited to dicyclopentadiene-modified unsaturated polyester resin synthesized using half-esterification, allyl glycidyl ether-modified unsaturated polyester resin, or trimethylolpropane diallyl ether-modified unsaturated polyester resin. All these polyester resins can be purchased from markets. The shrinking percentage of the unsaturated polyester resin suitable for air-drying is about between 5 and 8%.

The active diluent selected from the group consisting of diallyl phthalate, 2-chlorostyrene, and p-tert-butyl styrene, has capacity of anti-shrinking. As an active diluent, glycerol diallyl ether adipate has capacity of air dry. All these active diluents can be purchased from markets. As needed, other active diluents can also be applied.

The anti-shrinking agent is selected from the group consisting of polypropyl acetate, poly(adipate-co-propanetriol), poly vinyl acetate, polyacrylate, polystyrene, polyethylene, polyvinyl chloride, polymethyl methacrylate, or a mixture thereof.

Technical indexes according to building materials industry standards JC/T989-2006, PRC. are given below:

| Items | Technical indexes | |
|---|---|---|
| | High-class products | Qualified products |
| Color, appearance, and state in a container | Products should be fine viscous paste with uniform color, without obvious isolation and gel as well as rough particles, easy to stir, and color or package of products should be clearly distinguishable. | |
| Rebound deflection (MPa) ≧ | 2000 | 1500 |
| Impact flexibility (KJ/m²)) ≧ | 3.0 | 2.0 |
| Pressure-shear strength (MPa) ≧  Stone-stone  Standard conditions | 8.0 | 7.0 |

Example 1

The Usage Amount is Calculated by Weight

An adhesive for filling in gaps between stones comprises 100 weight parts of an unsaturated polyester resin suitable for air-drying, 5 weight parts of hydrogenated castor oil, and 15 weight parts of poly vinyl acetate (an anti-shrinking agent). The unsaturated polyester resin suitable for air-drying is dicyclopentadiene-modified unsaturated polyester resin synthesized using half-esterification.

Measurement shows that, the pressure-shear strength of the adhesive is 14.8 MPa, the tensile-shear strength thereof is 16.3 MPa, the rebound deflection thereof is 4435.0 MPa, the impact flexibility thereof is 2.2 $KJ/m^2$, the hardness (HSD) thereof is 73.4, and the shrinking percentage thereof is 0.09%.

In use, the adhesive is mixed and stirred uniformly with a curing agent, a mixing ratio of the adhesive to the curing agent being 100:3.

Example 2

The Usage Amount is Calculated by Weight

An adhesive for filling in gaps between stones comprises 100 weight parts of an unsaturated polyester resin suitable for air-drying, 5 weight parts of hydrogenated castor oil, 10 weight parts of silica (1,000 mesh on the average), and 15 weight parts of poly vinyl acetate (an anti-shrinking agent). The unsaturated polyester resin suitable for air-drying is dicyclopentadiene-modified unsaturated polyester resin synthesized using half-esterification.

Measurement shows that, the pressure-shear strength of the adhesive is 16.4 MPa, the tensile-shear strength thereof is 17.1 MPa, the rebound deflection thereof is 4085.6 MPa, the impact flexibility thereof is 3.0 $KJ/m^2$, the hardness (HSD) thereof is 71.0, and the shrinking percentage thereof is 0.05%.

In use, the adhesive is mixed and stirred uniformly with a curing agent, a mixing ratio of the adhesive to the curing agent being 100: 3.

Example 3

The Usage Amount is Calculated by Weight

An adhesive for filling in gaps between stones comprises 100 weight parts of an unsaturated polyester resin suitable for air-drying, one weight part of hydrogenated castor oil, 60 weight parts of silica (300 mesh on the average), one weight part of polystyrene (an anti-shrinking agent), 3 weight parts of diallyl phthalate, one weight part of styrene, and one weight part of α-methyl styrene (an active diluent). The unsaturated polyester resin suitable for air-drying is allyl glycidyl ether-modified unsaturated polyester resin.

Measurement shows that, the pressure-shear strength of the adhesive is 14.7 MPa, the tensile-shear strength thereof is 15.6 MPa, the rebound deflection thereof is 4673.2 MPa, the impact flexibility thereof is 2.61 $KJ/m^2$, the hardness (HSD) thereof is 64.5, and the shrinking percentage thereof is 2.63%.

The usage method of the adhesive is the same as that in Example 1.

Example 4

The Usage Amount is Calculated by Weight

An adhesive for filling in gaps between stones comprises 100 weight parts of an unsaturated polyester resin suitable for air-drying, 3 weight parts of hydrogenated castor oil, 40 weight parts of micron silica (900 mesh on the average), 8 weight parts of polyethylene (an anti-shrinking agent), and 3 weight parts of 2-chlorostyrene (an active diluent). The unsaturated polyester resin suitable for air-drying is dicyclopentadiene-modified unsaturated polyester resin synthesized using half-esterification.

Measurement shows that, the pressure-shear strength of the adhesive is 14.6 MPa, the tensile-shear strength thereof is 15.8 MPa, the rebound deflection thereof is 4490.5 MPa, the impact flexibility thereof is 2.89 $KJ/m^2$, the hardness (HSD) thereof is 66.8, and the shrinking percentage thereof is 0.85%.

The usage method of the adhesive is the same as that in Example 1.

Example 5

The Usage Amount is Calculated by Weight

An adhesive for filling in gaps between stones comprises 100 weight parts of an unsaturated polyester resin suitable for air-drying, 3 weight parts of hydrogenated castor oil, 50 weight parts of micron silica (800 mesh on the average), 8 weight parts of polyacrylate (an anti-shrinking agent), and 4 weight parts of p-tert-butyl styrene (an active diluent). The unsaturated polyester resin suitable for air-drying is trimethylolpropane diallyl ether-modified unsaturated polyester resin.

Measurement shows that, the pressure-shear strength of the adhesive is 15.4 MPa, the tensile-shear strength thereof is 16.7 MPa, the rebound deflection thereof is 4583.0 MPa, the impact flexibility thereof is 2.73 $KJ/m^2$, the hardness (HSD) thereof is 65.2, and the shrinking percentage thereof is 0.56%.

The usage method of the adhesive is the same as that in Example 1.

Example 6

The Usage Amount is Calculated by Weight

An adhesive for filling in gaps between stones comprises 100 weight parts of an unsaturated polyester resin suitable for air-drying, 3 weight parts of hydrogenated castor oil, 40 weight parts of micron silica (700 mesh on the average), and 10 weight parts of polypropyl acetate (an anti-shrinking agent). The unsaturated polyester resin suitable for air-drying is allyl glycidyl ether-modified unsaturated polyester resin.

Measurement shows that, the pressure-shear strength of the adhesive is 15.8 MPa, the tensile-shear strength thereof is 17.0 MPa, the rebound deflection thereof is 4364.7 MPa, the impact flexibility thereof is 2.94 $KJ/m^2$, the hardness (HSD) thereof is 67.0, and the shrinking percentage thereof is 0.96%.

The usage method of the adhesive is the same as that in Example 1.

Example 7

The Usage Amount is Calculated by Weight

An adhesive for filling in gaps between stones comprises 100 weight parts of an unsaturated polyester resin suitable for air-drying, 2 weight parts of hydrogenated castor oil, 30 weight parts of silica (600 mesh on the average), 2 weight parts of polyvinyl chloride, 3 weight parts of polyacrylat, and one weight part of glycerol diallyl ether adipate. The unsaturated polyester resin suitable for air-drying is trimethylolpropane diallyl ether-modified unsaturated polyester resin.

Measurement shows that, the pressure-shear strength of the adhesive is 16.2 MPa, the tensile-shear strength thereof is 17.8 MPa, the rebound deflection thereof is 4170.3 MPa, the impact flexibility thereof is 2.96 $KJ/m^2$, the hardness (HSD) thereof is 70.3, and the shrinking percentage thereof is 1.34%.

The usage method of the adhesive is the same as that in Example 1.

Example 8

The Usage Amount is Calculated by Weight

An adhesive for filling in gaps between stones comprises 100 weight parts of an unsaturated polyester resin suitable for air-drying, 4 weight parts of hydrogenated castor oil, 30 weight parts of silica (500 mesh on the average), 2 weight parts of poly vinyl acetate, 2 weight parts of styrene, one weight part of poly(adipate-co-propanetriol), 2 weight parts of polymethyl methacrylate, 2 weight parts of diallyl phthalate, and one weight part of glycerol diallyl ether adipate. The unsaturated polyester resin suitable for air-drying is trimethylolpropane diallyl ether-modified unsaturated polyester resin.

Measurement shows that, the pressure-shear strength of the adhesive is 14.9 MPa, the tensile-shear strength thereof is 16.3 MPa, the rebound deflection thereof is 4250.6 MPa, the impact flexibility thereof is 2.85 KJ/m$^2$, the hardness (HSD) thereof is 69.7, and the shrinking percentage thereof is 0.81%.

The usage method of the adhesive is the same as that in Example 1.

Example 9

The Usage Amount is Calculated by Weight

An adhesive for filling in gaps between stones comprises 100 weight parts of an unsaturated polyester resin suitable for air-drying, 2 weight parts of hydrogenated castor oil, 30 weight parts of silica (400 mesh on the average), 3 weight parts of polystyrene, one weight part of polymethyl methacrylate, 2 weight parts of diallyl phthalate, and 3 weight parts of 2-chlorostyrene (an anti-shrinking agent). The unsaturated polyester resin suitable for air-drying is trimethylolpropane diallyl ether-modified unsaturated polyester resin.

Measurement shows that, the pressure-shear strength of the adhesive is 16.3 MPa, the tensile-shear strength thereof is 17.6 MPa, the rebound deflection thereof is 4213.5 MPa, the impact flexibility thereof is 2.90 KJ/m$^2$, the hardness (HSD) thereof is 70.0, and the shrinking percentage thereof is 1.38%.

The usage method of the adhesive is the same as that in Example 1.

Example 10

The Usage Amount is Calculated by Weight

An adhesive for filling in gaps between stones comprises 100 weight parts of an unsaturated polyester resin suitable for air-drying, 4 weight parts of hydrogenated castor oil, 40 weight parts of silica (300 mesh on the average), 5 weight parts of polyacrylate, 2 weight parts of polymethyl methacrylate, one weight part of p-tert-butyl styrene, one weight part of glycerol diallyl ether adipate, one weight part of diallyl phthalate, and one weight part of 2-chlorostyrene. The unsaturated polyester resin suitable for air-drying is trimethylolpropane diallyl ether-modified unsaturated polyester resin.

Measurement shows that, the pressure-shear strength of the adhesive is 15.1 MPa, the tensile-shear strength thereof is 15.9 MPa, the rebound deflection thereof is 4293.8 MPa, the impact flexibility thereof is 2.78 KJ/m$^2$, the hardness (HSD) thereof is 68.9, and the shrinking percentage thereof is 1.07%.

The usage method of the adhesive is the same as that in Example 1.

In the trial period, the adhesive for filling in gaps between stones completely meet the requirement for filling in gaps between stones.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. An adhesive comprising: at least 100 weight parts of unsaturated polyester resin suitable for air-drying, between 1 and 5 weight parts of hydrogenated castor oil, between 10 and 60 weight parts of micron silica, and between 5 and 15 weight parts of anti-shrinking agent; wherein said unsaturated polyester resin suitable for air-drying is dicyclopentadiene-modified unsaturated polyester resin, allyl glycidyl ether-modified unsaturated polyester resin, or trimethylolpropane diallyl ether-modified unsaturated polyester resin.

2. The adhesive of claim 1, comprising 100 weight parts of said unsaturated polyester resin suitable for air-drying, between 2 and 4 weight parts of said hydrogenated castor oil, between 30 and 50 weight parts of said micron silica, and between 5 and 10 weight parts of said anti-shrinking agent.

3. The adhesive of claim 1, comprising 100 weight parts of said unsaturated polyester resin suitable for air-drying, 3 weight parts of said hydrogenated castor oil, 40 weight parts of said micron silica, and 8 weight parts of said anti-shrinking agent.

4. The adhesive of claim 1, wherein to said unsaturated polyester resin suitable for air-drying, a diluent, accelerator, and inhibitor of polymerization are added according to conventional usage amount.

5. The adhesive of claim 1, further comprising between 1 and 5 weight parts of an active diluent.

6. The adhesive of claim 1, wherein said micron silica is between 300 and 1,000 mesh.

7. The adhesive of claim 5, wherein said active diluent is selected from the group consisting of styrene, α-methyl styrene, glycerol diallyl ether adipate, diallyl phthalate, 2-chlorostyrene, p-tert-butyl styrene, and a mixture thereof.

8. The adhesive of claim 1, wherein said anti-shrinking agent is selected from the group consisting of polypropyl acetate, poly(adipate-co-propanetriol), poly vinyl acetate, polyacrylate, polystyrene, polyethylene, polyvinyl chloride, polymethyl methacrylate, and a mixture thereof.

9. The adhesive of claim 4, wherein in a process of the preparation of said unsaturated polyester resin suitable for air-drying, cycloalkane diols, neopentyl glycol, hydrogenated bisphenol A, trans-double dehydration mannitol, or isophthalic acid is added.

10. An adhesive comprising: at least 100 weight parts of unsaturated polyester resin suitable for air-drying, between 1 and 5 weight parts of hydrogenated castor oil, between 10 and 60 weight parts of micron silica, and between 5 and 15 weight parts of anti-shrinking agent;
wherein:
said unsaturated polyester resin suitable for air-drying is dicyclopentadiene-modified unsaturated polyester resin, allyl glycidyl ether-modified unsaturated polyester resin, or trimethylolpropane diallyl ether-modified unsaturated polyester resin; and
said anti-shrinking agent is poly(adipate-co-propanetriol), poly vinyl acetate, polyacrylate, polystyrene, polyethylene, polyvinyl chloride, polymethyl methacrylate, or a mixture thereof.

11. The adhesive of claim 10, wherein said adhesive comprises 100 weight parts of said unsaturated polyester resin suitable for air-drying, between 2 and 4 weight parts of said hydrogenated castor oil, between 30 and 50 weight parts of said micron silica, and between 5 and 10 weight parts of said anti-shrinking agent.

12. The adhesive of claim 10, wherein said adhesive comprises 100 weight parts of said unsaturated polyester resin suitable for air-drying, 3 weight parts of said hydrogenated castor oil, 40 weight parts of said micron silica, and 8 weight parts of said anti-shrinking agent.

13. The adhesive of claim 10, wherein to said unsaturated polyester resin suitable for air-drying, a diluent, accelerator, and inhibitor of polymerization are added.

14. The adhesive of claim 10, wherein said micron silica is between 300 and 1,000 mesh.

15. The adhesive of claim 10, wherein said unsaturated polyester resin is allyl glycidyl ether-modified unsaturated polyester resin, or trimethylolpropane diallyl ether-modified unsaturated polyester resin.

16. The adhesive of claim 10, wherein said adhesive further comprises between 1 and 5 weight parts of an active diluent.

17. The adhesive of claim 16, wherein said active diluent is styrene, α-methyl styrene, glycerol diallyl ether adipate, diallyl phthalate, 2-chlorostyrene, p-tert-butyl styrene, or a mixture thereof.

18. An adhesive comprising: at least 100 weight parts of unsaturated polyester resin suitable for air-drying, between 1 and 5 weight parts of hydrogenated castor oil, between 10 and 60 weight parts of micron silica, and between 5 and 15 weight parts of anti-shrinking agent;
   wherein:
      said unsaturated polyester resin is allyl glycidyl ether-modified unsaturated polyester resin, or trimethylolpropane diallyl ether-modified unsaturated polyester resin; and
      said anti-shrinking agent is poly(adipate-co-propanetriol), poly vinyl acetate, polyacrylate, polystyrene, polyvinyl chloride, polymethyl methacrylate, or a mixture thereof.

19. The adhesive of claim 18, wherein said adhesive further comprises between 1 and 5 weight parts of an active diluent.

20. The adhesive of claim 19, wherein said active diluent is styrene, α-methyl styrene, glycerol diallyl ether adipate, diallyl phthalate, 2-chlorostyrene, p-tert-butyl styrene, or a mixture thereof.

* * * * *